United States Patent [19]

Kelkenberg et al.

[11] 4,356,307
[45] Oct. 26, 1982

[54] CYCLIC IMIDES, THEIR PREPARATION AND USE

[75] Inventors: Heike Kelkenberg, Bottrop; Elmar Wolf, Recklinghausen, both of Fed. Rep. of Germany

[73] Assignee: Chemische Werke Hüls Aktiengesellschaft, Marl, Fed. Rep. of Germany

[21] Appl. No.: 234,609

[22] Filed: Feb. 17, 1981

[30] Foreign Application Priority Data

Feb. 20, 1980 [DE] Fed. Rep. of Germany ....... 3006272

[51] Int. Cl.³ .......................................... C07D 401/04
[52] U.S. Cl. .................................... 546/200; 546/188; 546/201; 546/208; 524/89; 524/94; 524/102; 524/103; 524/91
[58] Field of Search ................ 546/188, 200, 201, 208

[56] References Cited

U.S. PATENT DOCUMENTS 4,053,615 10/1977 Boyle et al. .......................... 546/200

Primary Examiner—Robert T. Bond
Attorney, Agent, or Firm—Oblon, Fisher, Spivak, McClelland & Maier

[57] ABSTRACT

Cyclic imides of the formula:

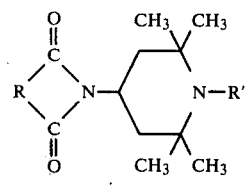

in which R represents a saturated or unsaturated, optionally alkyl- or alkenyl-substituted alkylene or cycloalkylene radical having 2–120 C-atoms and R' represents hydrogen or a substituent selected from the group consisting of
  an alkyl radical having 1–20 C-atoms,
  an alkenyl radical having 3–5 C-atoms,
  an aralkyl radical having 7–12 C-atoms,
  —CH₂—CH₂—CN,
  —CH₂—CH₂—COO—alkyl,
  —CH₂—CH₂(CH₃)—COO-alkyl
  an acyl radical or
  —(CH₂—CH₂O)$_n$H, wherein n is 1–10
are stabilizers for synthetic resins especially for polyolefins.

5 Claims, No Drawings

CYCLIC IMIDES, THEIR PREPARATION AND USE

BACKGROUND OF THE INVENTION

1. Field of the Invention

The present invention relates to new cyclic imides and their use as stabilizers for plastics, especially polyolefins, against photo and/or thermal degradation.

2. Brief Description of the Prior Art

Recently a series of derivatives of 2,2,6,6-tetramethylpiperidine have proven particularly suitable for stabilizing polymers. Examples of these are the esters of the corresponding 4-hydroxytetramethylpiperidine which have been successfully used. In addition, however, various derivatives of 4-amino-2,2,6,6-tetramethylpiperidine have been suggested.

SUMMARY OF THE INVENTION

The present invention relates to a new class of chemical compounds that can also be derived from 4-amino-2,2,6,6-tetramethylpiperidine.

The object of the invention is cyclic imides of the following general formula:

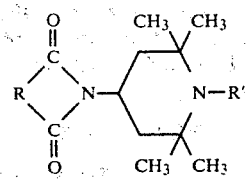

in which R represents a saturated or unsaturated, optionally alkyl- or alkenyl-substituted alkylene or cycloalkylene radical having 2–120 C-atoms and in which R' represents hydrogen or a substitutent such as
  an alkyl radical having 1–20 C-atoms,
  an alkenyl radical having 3–5 C-atoms,
  an aralkyl radical having 7–12 C-atoms,
  $-CH_2-CH_2-CN$,
  $-CH_2-CH_2-COO-$alkyl,
  $-CH_2-CH(CH_3)-COO-$alkyl
  an acyl radical or
  $-(CH_2-CH_2O)_nH$, wherein n can be 1–10.

This class of compounds has the advantage that it is especially thermostable and compatible with polyolefins. In addition it can be prepared by a simple synthesis as described hereinbelow.

DETAILED DESCRIPTION OF THE INVENTION AND PREFERRED EMBODIMENTS

The cyclic imides of the general formula I can be prepared in accordance with known methods through the reaction of cyclic anhydrides or their corresponding acids with 4-amino-2,2,6,6-tetramethylpiperidine. This can be carried out with or without solvent. Water produced in the reaction is removed by distillation. The replacement of hydrogen in the R' position in formula I by other substituents is then carried out by conventional methods. The advantage here compared to known methods is that only one amino group of the diamine reacts with the anhydrides so that no bisimides can form. With known methods of producing related imideamides (sic) from hexamethylene diamine or phenylene diamine, for example, the diamine is used in great excess to avoid the formation of bisimides.

Therefore, an additional object of the invention is the production of cyclic imides of the general formula:

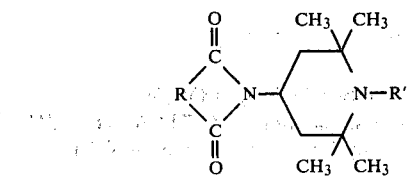

wherein 4-amino-2,2,6,6-tetramethylpiperidine is reacted with cyclic anhydrides of the following formula:

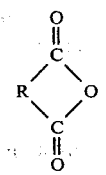

wherein R has the meaning given above, or the corresponding acids, at temperatures of 110°–250° C., particularly 200° C., and optionally, when R'=H, replacing it in a known manner by other substituents.

The cyclic anhydrides which can be used include, for example, succinic anhydride, known alkyl or alkenyl succinic anhydrides and known Diels-Alder adducts of maleic anhydride and dienes such as butadiene, isoprene, piperylene, cyclopentadiene, trimethylcyclohexadiene, among others, and the corresponding hydrogenated Diels-Alder products. The compounds of formula I according to the invention can be particularly advantageously used as stabilizers for plastics, particularly polyolefins, against damage by the action of oxygen, heat and light.

It is, therefore, an additional object of the invention to use the cyclic imides according to the invention to stabilize synthetic resins, particularly polyolefins.

These stabilizers are added to the synthetic resins in a concentration of 0.01 to 5% by weight, preferably 0.2–0.4% b.w., based on the amount of synthetic resin, e.g., polyolefin.

The stabilizers can be incorporated after polymerization, for example by mixing the cyclic imides and optional additional additives into the melt by techniques conventional in the art.

The preparation and use of the compounds of the invention are more particularly described in the following examples.

Preparation

EXAMPLE 1

N-(2,2,6,6-tetramethyl-4-piperidyl)-n-dodecylsuccinimide.

405 g (2.4 moles) of dodecene-1 and 196 (2.0 moles) of maleic anhydride are reacted in 800 ml of toluene at 230° C. for 8 hours in a 2 l steel autoclave. Excess α-olefin and unreacted maleic anhydride are distilled off under vacuum. Then hydrogenation is carried out, again in toluene, in the presence of palladium at 80° C. The crude hydrogenated solution freed from the catalyst is reacted with 312 g (2.0 moles) of triacetone diamine (4-amino-2,2,6,6-tetramethylpiperidine) at 200° C. for 3 hrs under pressure. The water of reaction and the toluene are distilled off.

The crude N-(2,2,6,6-tetramethyl-4-piperidyl)-n-dodecylsuccinimide is worked up by distillation under high vacuum.

Boiling point: 195° C. at $10^{-4}$ bar.
$n_D^{25}$: 1.4815.
Saponification number: 137 mg KOH/g.
Elemental Analysis: Calculated: C 73.9%, H 11.3%, N 6.9%, O 7.9%. Found: C 73.7%, H 11.0% N 7.1%, O 7.8%.

EXAMPLE 2

N-(2,2,6,6-tetramethyl-4-piperidyl)-n-hexadecylsuccinimide.

By a procedure analogous to that of Example 1, 537 g (2.4 moles) of hexadecene-1 are reacted instead of dodecene-1 using xylene instead of toluene.

Boiling point: 220° C. at $10^{-4}$ bar
Melting point: 39° C.
Saponification number: 118 mg KOH/g
Elemental analysis: Calculated: C 75.3%, H 11.7%, N 6.1%, O 6.9%. Found: C 75.4%, H 11.5%, N 6.3%, O 7.0%.

EXAMPLE 3

N-(2,2,6,6-tetramethyl-4-piperidyl)-n-octadecylsuccinimide.

By a procedure analogous to that of Example 1, 606 g (2.4 moles) of octadecene-1 are reacted instead of dodecene-1 in xylene instead of toluene.

Boiling point: 263° C. at $10^{-4}$ bar
Melting point: 44° C.
Saponification number: 111 mg KOH/g
Elemental analysis: Calculated: C 75.9%, H 11.8%, N 5.7%, O 6.5%. Found: C 75.8%, H 11.6%, N 6.1%, O 6.6%.

EXAMPLE 4

N-(2,2,6,6-tetramethyl-4-piperidyl) polybutadienylsuccinimide.

300 g of the technical adduct of Polyol 110 (1,4-cis-polybutadiene oil, DP: ca. 1500, commercial product of Chemische Werke Huls AG) and 10% by weight of maleic anhydride are reacted with 47.8 g of 4-amino-2,2,6,6-tetramethylpiperidine in 1 l of toluene at 200° C. for 2 hrs. The water of reaction and toluene are then distilled off. The residue is a semiliquid, dark oil.

Viscosity (50° C.): 8.05 Pa.s.
Saponification number: 42 mg KOH/g.
Nitrogen conent: 2.1%.

EXAMPLES 5–12

Diels-Alder adducts of dienes and maleic anhydride (including technical products and those produced by known methods) as well as their hydrogenation products produced by conventional methods, are used as starting materials.

EXAMPLES 5–9

6 moles of Diel-Alder adduct or its hydrogenation product are reacted with 6 moles of 4-amino-2,2,6,6-tetramethylpiperidine in 4 l of xylene in a 12 l steel autoclave at 200° C. for 3 hrs. After the water of reaction and the solvent are distilled off, the cyclic imide formed is distilled under high vacuum.

EXAMPLE 5

N-(2,2,6,6-tetramethyl-4-piperidyl)hexahydrophthalimide
Boiling point: 146° C. at $10^{-4}$ bar.
Melting point: 103°–104° C.
Saponification number: 192 mg KOH/g.
Elemental analysis: Calculated: C 69.9%, H 9.6%, N 9.6%, O 11.0%. Found: C 70.0%, H 9.7%, N 9.6%, O 10.6%.

EXAMPLE 6

N-(2,2,6,6-tetramethyl-4-piperidyl)-4-methyltetrahydrophthalimide
Boiling point: 148° C. at $10^{-4}$ bar.
Melting point: 78°–80° C.
Saponification number: 183 mg KOH/g.
Elemental analysis: Calculated: C 71.1%, H 9.2%, N 9.2%, O 10.5%. Found: C 70.8%, H 9.3%, N 8.9%, O 10.1%.

EXAMPLE 7

N-(2,2,6,6-tetramethyl-4-piperidyl)-4-methylhexahydrophthalimide
Boiling point: 153° C. at $3 \cdot 10^{-4}$ bar.
Pour-point: 35° C.
Saponification number: 184 mg KOH/g.
Elemental analysis Calculated: C 70.6%, H 9.8%, N 9.2%, O 10.5%. Found: C 70.8%, H 9.9%, N 9.1% O 10.8%.

EXAMPLE 8

N-(2,2,6,6-tetramethyl-4-piperidyl)-4,6,6-trimethyl-bicyclo[2.2.2]oct-7-ene-2,3-dicarboxylic acid imide
Boiling point: 182° C. at $6 \cdot 10^{-4}$ bar.
Melting point: 55°–60° C.
Saponification number: 156 mg KOH/g.
Elemental analysis: Calculated: C 73.7%, H 9.5%, N 7.8%, O 8.9%. Found: C 73.6%, H 9.6%, N 7.4%, O 9.2%.

EXAMPLE 9

N-(2,2,6,6-tetramethyl-4-piperidyl)-4,6,6-trimethyl-bicyclo[2.2.2]octane-2,3-dicarboxylic acid imide
Boiling point: 180° C. at $3 \cdot 10^{-4}$ bar.
Melting point: 50°–58° C.
Saponification number: 157 mg KOH/g.
Elemental analysis: Calculated: C 73.3%, H 10.0%, N 7.8%, O 8.9%. Found: C 73.0%, H 10.0%, N 7.6%, O 9.1%.

EXAMPLE 10

N-(2,2,6,6-tetramethyl-4-piperidyl)bicyclo[2.2.1-]hept-5-ene-2,3-dicarboxylic acid imide Bicyclo[2.2.1-]hept-5-ene-2,3-dicarboxylic acid anhydride is reacted as in Examples 5–9. The workup, however, is not carried out by high vacuum distillation, but rather by recrystallization from xylene.

Melting point: 157°–158° C.
Saponification number: 184 mg KOH/g.
Elemental analysis: Calculated: C 71.5%, H 8.6%, N 9.3%, O 10.6%. Found: C 71.6%, H 8.7%, N 9.1%, O 10.6%.

EXAMPLES 11 and 12

4-Amino-2,2,6,6-tetramethylpiperidine is slowly added to the Diels-Alder adduct melt or its hydrogenation product at ca. 150° C. in a mole ratio of 1:1. It is then stirred for another hour. A portion of the water of reaction distills off during this period. The reaction mixture is then heated briefly to 200°–230° C. After the water of reaction is completely distilled off, the product cyclic imide is purified by distillation under high vacuum.

EXAMPLE 11

N-(2,2,6,6-tetramethyl-4-piperidyl)-Δ4-tetrahydrophthalimide
Boiling point: 158° C. at 3·10$^{-4}$ bar.
Melting point: 98° C.
Saponification number: 193 mg KOH/g.
Elemental analysis: Calculated: C 70.3%, H 9.0%, N 9.5%, O 11.0%. Found: C 70.5%, H 9.1%, N 9.5%, O 10.9%.

EXAMPLE 12

N-(2,2,6,6-tetramethyl-4-piperidyl)-3-methylhexahydrophthalimide
Boiling point: 148° C. at 3.·10$^{-4}$ bar.
Pour-point: 33° C.
Saponification number: 184 KOH/g.
Elemental analysis: Calculated: C 70.6%, H 9.8%, N 9.2%, O 10.5%. Found: C 70.9%, H 10.0%, N 8.9%, O 11.0%.

Application

EXAMPLE 13

The cyclic imides described in Examples 1, 2, 3 and 10 were tested for effectiveness as stabilizers in polypropylene. To this end they were incorporated into a polypropylene melt (Vestolen P 5202 ®, commercial product of the company Chemische Werke Huls AG) at a concentration of 0.4% based on the polymer.

The known stabilizers based on tetramethylpiperidine are Tinuvin 770 ® (a commercial product of Ciba-Geigy AG), as well as two commercial products of the Chimosa Company, also based on tetramethylpiperidine. The comparison substances were used in a concentration of only 0.2%, based on the polymer, because, due to their chemical composition, the UV-stabilizing component, the tetramethylpiperidyl radical, is contained in nearly double the concentration as compared to the test substances.

The test was carried out by the Xenotest 1200 procedure. The test results are summarized in the following table.

| Test Substance (% by weight) | Xenotest 1200 | | | |
|---|---|---|---|---|
| | Test Duration (hr) | Brittleness (hr) | Surface Cracks (hr) | Opacity (hr) |
| Tinuvin 770 ® | 0.2 | >7500 | none | 5020 | 2250 |
| Chimassorb CR 141 ® | 0.2 | 3500 | 3500 | 2300 | 1200 |
| Chimassorb CR 144 ® | 0.2 | 3200 | 3200 | 2300 | 1300 |
| Imide Ex. 1 | 0.4 | >7500 | none | 5020 | 3750 |
| Imide Ex. 2 | 0.4 | 7400 | 7400 | 3100 | 2950 |
| Imide Ex. 3 | 0.4 | 6300 | 6300 | 4050 | 3750 |
| Imide Ex. 10 | 0.4 | >6700 | none | 2950 | 2500 |

EXAMPLE 14

The cyclic imides according to the invention were incorporated into polypropylene as in Application Example 13 in combination with Tinuvin 327 ®, a known stabilizer based on benzotriazole (commercial product of Ciba Geigy AG), and tested. As in Example 13, the comparison substances are Tinuvin 770 ® and the two commercial products of the Chimosa Company. The concentrations were, in each case, 0.2% of the test substance or 0.1% of the comparison substance combined with 0.1% Tinuvin 327 ®. In all instances the given concentrations are based on the amount of polymer used.

The test was carried out by the Xenotest 1200 procedure. The test results are summarized in the following table.

| Test Substance + Tinuvin 327 ® (0.1% by weight) | Xenotest 1200 | | | |
|---|---|---|---|---|
| | Test Duration (hr) | Brittleness (hr) | Surface Cracks (hr) | Opacity (hr) |
| Tinuvin 770 ® | 0.1 | >7500 | none | 4050 | 2100 |
| Chimassorb CR 141 ® | 0.1 | >6700 | none | 3250 | 1300 |
| Chimassorb CR 144 ® | 0.1 | >6700 | none | 3250 | 1300 |
| Imide Ex. 1 | 0.2 | >7500 | none | 3750 | 3750 |
| Imide Ex. 2 | 0.2 | >7500 | none | 4050 | 3750 |
| Imide Ex. 3 | 0.2 | 7500 | 7500 | 4050 | 2100 |
| Imide Ex. 10 | 0.2 | >6700 | none | 6250 | 3100 |

We claim:
1. A cyclic imide of the formula:

$$\begin{array}{c} O \\ \parallel \\ R \diagdown \begin{array}{c} C \\ \diagup \\ \diagdown \\ C \\ \parallel \\ O \end{array} N - \begin{array}{c} CH_3 \quad CH_3 \\ \diagup \quad \diagdown \\ \diagdown \quad \diagup \\ CH_3 \quad CH_3 \end{array} N - R^1 \end{array}$$

wherein R is a saturated or unsaturated, optionally alkyl- or alkenyl-substituted alkylene or cycloalkylene radical having 2–120 C-atoms and R' is selected from the group consisting of hydrogen,
an alkyl radical having 1–20 C-atoms,
an alkenyl radical having 3–5 C-atoms,
an aralkyl radical having 7–12 C-atoms,
—CH$_2$—CH$_2$—CN,
—CH$_2$—CH$_2$—COO—alkyl,
—CH$_2$—CH(CH$_3$)—COO—alkyl,
an acyl radical or
—(CH$_2$—CH$_2$O)$_n$H, wherein n is 1–10.

2. The cyclic imide of claim 1, wherein R has the formula $$\begin{array}{c} | \\ R'' - CH_2 \\ | \\ CH_2 \\ | \end{array}$$

wherein R" is a C$_{12}$–C$_{18}$ alkyl group.

3. The cyclic imide of claim 1, wherein R is a cycloalkylene group.

4. The cyclic imide of claim 1, wherein R is selected from the group consisting of 1,2-cyclohexanediyl and methyl-substituted 1,2-cyclohexanediyl radicals.

5. The cyclic imide of claim 1, wherein R is a bicyclic divalent aliphatic radical.

* * * * *